Feb. 5, 1946.  J. F. HABERLIN  2,394,305
AIRCRAFT GUN-SIGHTING ARRANGEMENT
Original Filed Dec. 2, 1939  2 Sheets-Sheet 1
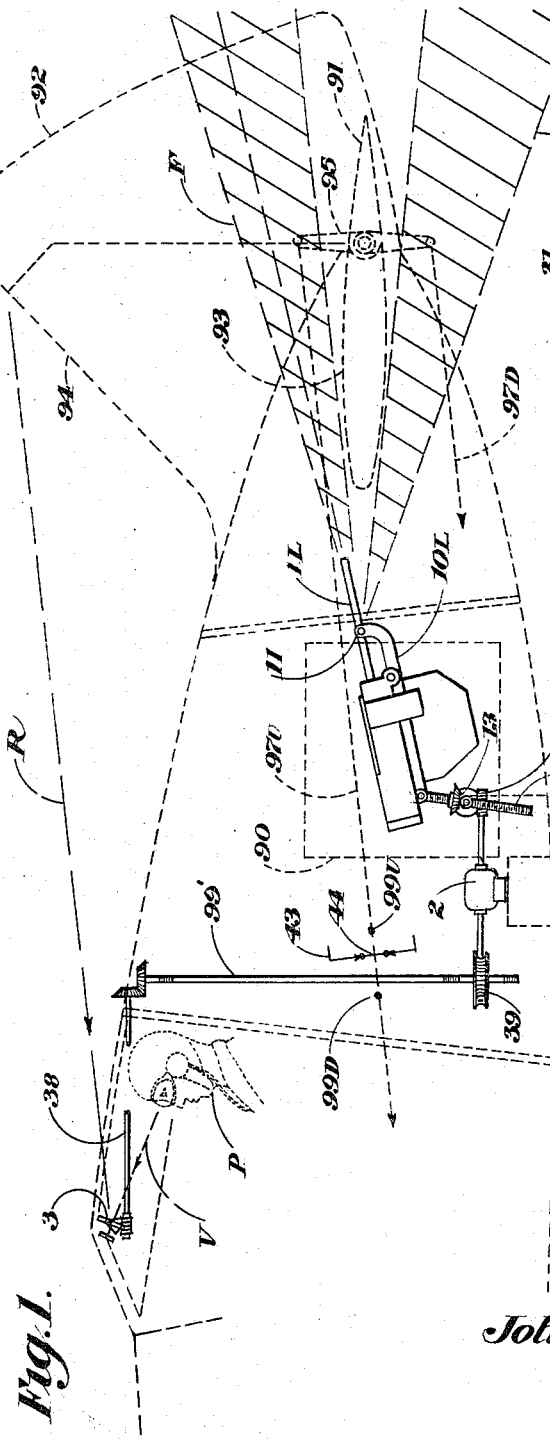
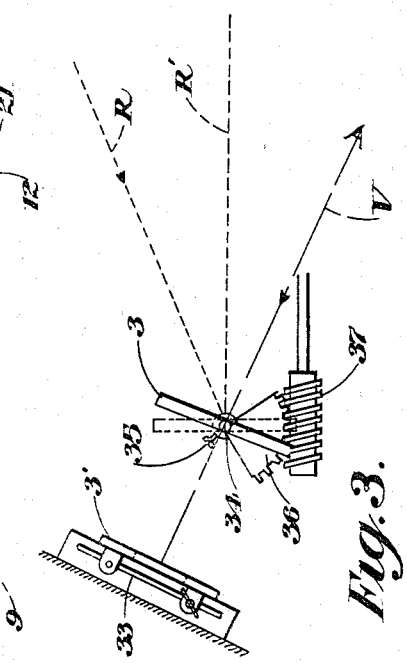
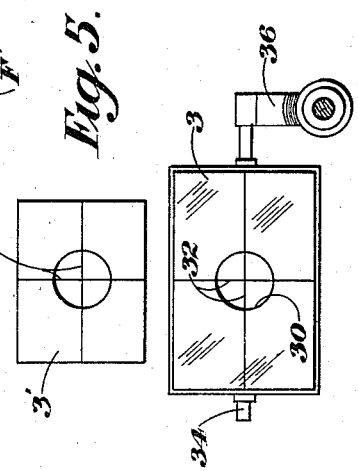
John F. Haberlin INVENTOR.
BY
His Patent Attorney

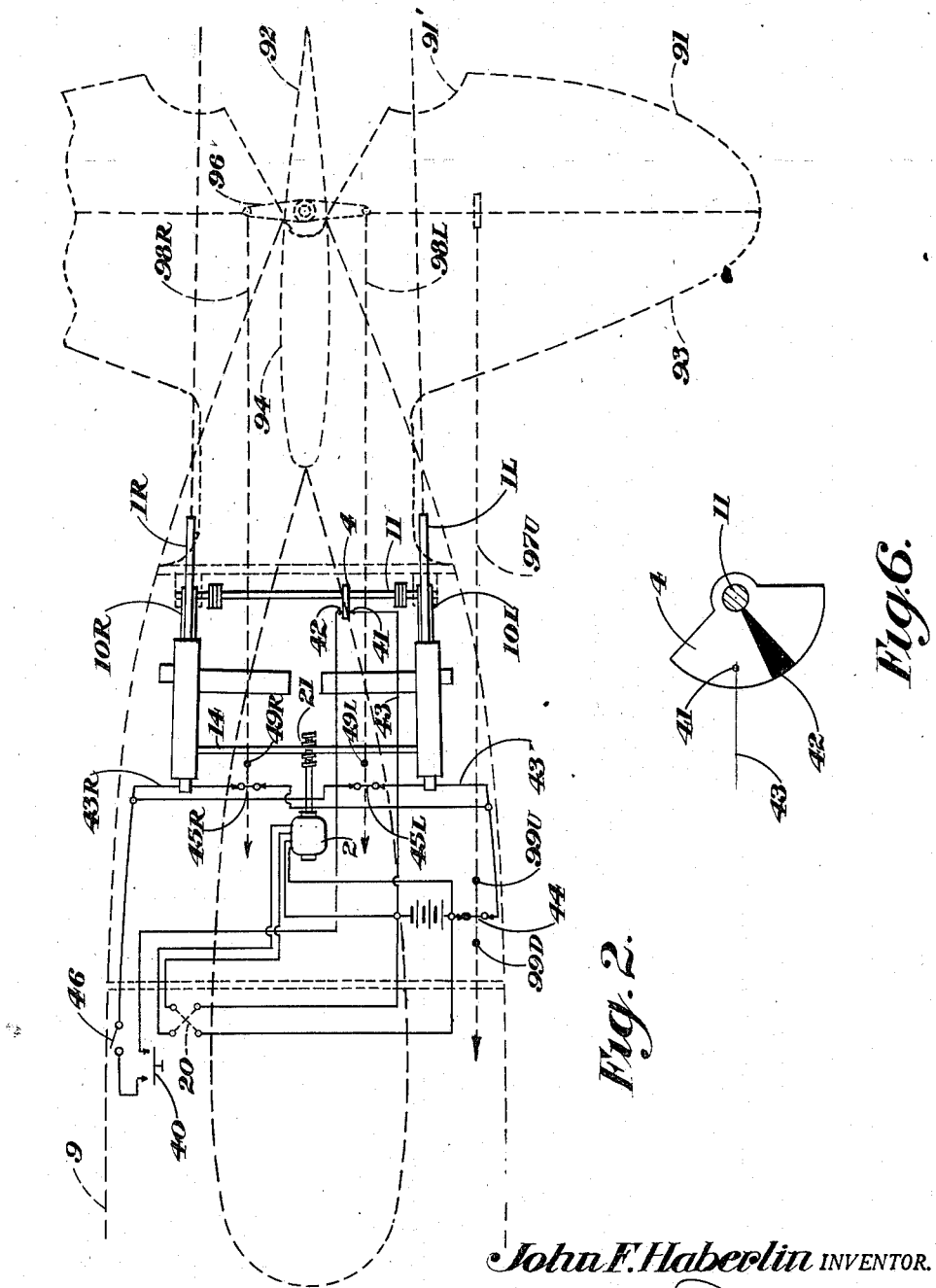

Patented Feb. 5, 1946

2,394,305

UNITED STATES PATENT OFFICE 2,394,305

AIRCRAFT GUN-SIGHTING ARRANGEMENT

John F. Haberlin, Seattle, Wash., assignor to Boeing Aircraft Company, Seattle, Wash., a corporation of Washington Original application December 2, 1939, Serial No. 307,273, now Patent No. 2,304,566, dated December 8, 1942. Divided and this application May 26, 1942, Serial No. 444,527

6 Claims. (Cl. 89—37.5)

This invention relates to military airplanes, and more particularly to ordnance for single-seated aircraft of the pursuit or fighter type. The invention is concerned with the provision of means whereby the pilot of such aircraft may aim and fire a gun or guns rearwardly to protect himself from attacks from the rear.

The present application is a division of my copending application Serial No. 307,273, filed December 2, 1939, covering improvements in Fire control mechanism, which issued December 8, 1942, as Patent No. 2,304,566.

Single-seated military airplanes are normally armed with one or more machine guns, directed forwardly, since such airplanes are intended primarily as fighters to pursue and attack larger airplanes such as bombers, while in flight; the fighters are normally so fast that reliance is placed upon their speed to avoid attacks upon them from the rear. However, when a group of bombing airplanes convoyed by pursuit planes is attacked by enemy pursuit planes, there immediately ensues combats between individual pursuit planes of approximately equal speed and maneuverability; and in such dogfights each fighter, knowing that the other has only forwardly directed machine guns, endeavors to keep out of the forward line of fire of his opponent, and instead to place himself on the tail of his opponent, where he can destroy him with forwardly directed fire from his own guns. The fighter who permits an opponent thus to gain the advantage of a position on his tail has no defense other than skillful maneuvering. Occasionally, too, an airplane or a patrol may be attacked by enemy airplanes, which, without being seen, attain a position on their tail.

To this end it has previously been proposed to provide single-place aircraft with fixed or semi-fixed rearwardly directed guns to afford this desired protection from the rear. These prior arrangements, however, still had the decided disadvantage that a considerable degree of maneuvering or jockeying for position was required by the pilot before he could bring the enemy into the line of sight of one of the fixed positions of his gun.

It is accordingly a principal object of the present invention to afford to such a single-place fighter aircraft the advantage of a rearwardly directed semi-flexible gun, whereby should its pilot find an opponent upon his tail, he will stand a better chance of destroying his opponent instead of being himself destroyed, or being forced to maneuver to escape attack.

It is known in larger airplanes to provide rearwardly directed flexible guns, such guns being completely adjustable for aiming, but almost always heretofore it has been necessary to carry an extra gunner to aim and fire such rearwardly directed guns. This constituted an added burden, and if such added weight was to be carried it would be better to carry additional ammunition or fuel, or both, and without such added weight the ceiling, rate of climb, maneuverability and other performance characteristics of the airplane could be improved. In an airplane of the pursuit type, if additional personnel are to be carried, it would probably be more advantageous to make provision for a copilot, for example, rather than for a tail gunner, so that in case one should be wounded, or become incapacitated such as when flying at high altitudes, the other could take charge. Also when used in such larger airplanes as mentioned above, the weight-carrying ability or performance of the airplane can be improved by an installation of the type disclosed herein, instead of the conventional type of directly aimed gun. Thus while I have described my invention particularly as applied to a single-seat airplane, the characteristics of the installation are the same as when used in such other airplanes. In each instance the gun is fired by a forwardly facing gunner, whether he be a pilot or other crew member.

It has been proposed to mount a rearwardly firing gun in a single-seated airplane, and to adjust it to fire in either of two positions; for aiming, two separate aiming means have been provided, one fixed with relation to one position of the gun, and the other fixed with relation to the alternative position of the gun. This affords some measure of rearward protection, but still if an enemy airplane attacks from the rear and within the necessarily fairly wide angle between the two firing positions, the only way either gun may be aimed accurately is to maneuver the airplane. Maneuvering breaks up formations, and destroys the protection of the mass of fire of the whole formation, besides interrupting forward progress and perhaps leaving a convoyed formation open to attack. It is therefore preferable to enable rearwardly firing guns to be trained upon an enemy approaching from the rear in any of numerous firing positions, by a forwardly facing crew member. However, it has not been deemed possible heretofore, so far as I am aware, to provide a rearwardly directed gun in a single-seated fighter with suitably arranged sighting means for such a gun, properly coordinated therewith, in such a way that a forwardly facing occupant of the airplane could effectively aim and fire the gun through a plurality of positions intermediate the limits through which the gun is elevated or traversed. The provision of means to this end is the primary object of this invention.

Prior fixed guns fired either above or below the elevator and horizontal stabilizer, and it has also been proposed that a plurality of such guns might be carried, one pointing above and one below these control surfaces; but in any event, when such rearwardly directed guns became known to the enemy to be fixed in position, or only capable of firing in one of two divergent directions, or at the extreme limits of their elevation or traverse, their line or lines of fire readily became avoided. It is therefore a further object of the present invention to provide means to adjust such rearwardly directed guns in a single-seated military airplane, for aiming them, and moreover, to coordinate the adjustment of the guns with an adjustment of the sighting means, to the end that the two may always be kept automatically in proper coordination. It is then possible to aim the rearwardly directed guns, either by maneuvering the airplane, or by adjusting the guns relative to the airplane, or both, with the result that the field of fire rearwardly is made sufficiently wide in angle as to afford effective protection, especially when it is considered that the two opponents will have airplanes of approximately equal speed. Prior installations have proven decidedly objectionable in these respects inasmuch as in all cases known to applicant the airplane had to be maneuvered or aimed into firing position and this frequently was neither attainable nor desirable.

The weight of such rearwardly firing guns and their ammunition being appreciable, as compared to the capabilities of such a single-seated fighter, they will normally be located as close as possible to the airplane's center of gravity, and almost certainly close to the longitudinal medial axis of the airplane. In such a position their line of fire will normally lie close to one of the control surfaces of the empennage, and some one or more of the swingable control surfaces may at times intersect the line of fire. Indeed, if the guns are adjustable for aiming, their field of fire may encompass fixed control surfaces, such as the vertical fin or the horizontal stabilizer, and in addition, in certain swung positions of either the elevator or the rudder, or both, these may intersect the field of fire of the gun in some given adjusted position of the gun. It is desirable to restrict the field of fire of the gun to the slightest degree, and to keep the guns capable of action to the greatest possible degree, yet it is essential that the gun be prevented from shooting away the control surfaces of its own airplane. On the other hand, it is scarcely possible for the pilot to take care to cease firing during times, often but momentarily, that there is conflict between the position of a control surface and line of fire of the gun. Accordingly, the above referred to parent Application Serial No. 307,273, now Patent No. 2,304,566, provides means for interconnecting the various controls for the control surfaces, the controls for firing the gun, and the controls for adjusting the gun, to the end that automatically and in any position of the control surfaces or of the gun, any given gun is prevented from firing when any control surface, fixed or movable, lies within the field of fire of that gun, whatever may be the gun's position or the position of such control surface.

Indeed, the advantages of such automatic interdicting means are not confined only to single-seated airplanes nor to rearwardly firing guns, and it may be stated in broader terms that it was an object of the said parent application to provide means automatically operable which will prevent the firing of a gun whenever, by reason of adjustment of the gun in aiming, or by reason of movement of a control surface or like movable member of the airplane, such element of the airplane comes within the field of fire of the gun, yet which permits firing of the gun without restriction and without interdiction, at all other times.

It is a further object of the invention to provide an installation of this sort which may be conveniently mounted and supplied with ammunition, and from which the discharged cases and links may readily be removed, and indeed, to provide an installation which is capable of cooperating with the structural details of the airplane in various ways, and without affecting the aerodynamic characteristics of the airplane.

With these and other objects in mind, as will appear hereafter, my invention comprises the novel gun and mount therefor, and the provision thereof with novel sighting means, as and for the purposes set forth above, and the novel combination of such a gun and sighting means with the controls and control surfaces of the airplane whereon it is mounted.

In the accompanying drawings the invention is shown largely in diagrammatic form, and in several possible arrangements.

Fig. 1 is a side elevation of an adjustable gun installation as applied to a single-seated military airplane, and Fig. 2 is a diagram and view in plan, illustrating principally the interrelation of the controls.

Fig. 3 is a side elevation of a preferred modification of my sighting device, and Figs. 4 and 5 are elevations of component parts thereof.

Fig. 6 is an elevation of a safety control having to do with the adjustment of the gun for aiming.

In a preferred form of my invention shown in the elevation and plan in Figs. 1 and 2, the guns IR and IL are adjustable in elevation, and when dual guns are employed both are preferably directed substantially alike, that is, both are either upwardly directed or downwardly directed at the same angle to the horizontal, although it is not outside the scope of my invention to arrange them relatively at a slight vertical angle—such an angle, for instance, as will permit one to fire over or under the horizontal stabilizer as the other, during adjustment, is blanked thereby. In such manner one gun or the other is always ready for action, notwithstanding the disabling of the other (as later described) during adjustment. However, their lines of fire may also converge rearwardly, as seen in the plan in Fig. 2, so that both may be brought to bear at a given target or aiming point located a known distance to the rear of the airplane. The cradles 10R and 10L whereon these guns are carried, and by reason of which they are adjustable, are in turn carried upon a transverse rock shaft 11, and adjustment of both guns about this rock shaft is accomplished in unison by an arrangement such as the jack screw 12 and the rotatable nut 13 (see Fig. 1), the nuts being rotated by suitable drive means 21 on a transverse shaft 14 which in turn is driven from a reversible motor 2.

The pilot, shown at P, is usually seated in a small cockpit of the airplane 9 wherein there is little chance for him to move about or change his position to any considerable extent, and he must maintain observation to the front. In modern military airplanes he will normally be within a hooded cockpit. However, it is possible to support within the hood, in advance of the pilot and in such position that he need shift his line of vision but slightly, sighting means which include a rear-view mirror 3. If desired, or if necessary, he may have two sighting means, one for each of the guns IR and IL. Any convenient sighting means may be employed in conjunction with such a mirror, or the sighting means may incorporate such a mirror. Purely as a convenient and suitable means to the end in view, I have illustrated the sighting means which I shall shortly describe. Before describing it, however, let me point out that the rear-view mirror 3 is so positioned relative to the line of vision V from the pilot's eye, and with relation to the direction assumed by the barrel of the gun, that a target, such as an airplane on the tail of the pilot's airplane, which is seen within the mirror 3 (particularly when it arrives at a given position in that mirror), is in the line of fire of the gun.

The sighting means herein shown includes, in addition to the rear-view mirror 3, a pair of cross hairs 31, and the mirror has a central aperture 30, and similar cross hairs 32. The cross hairs 31 are spaced from the cross hairs 32 in the line of vision V of the pilot, so that the pilot, looking along the line V, picks up his target in the mirror 3, and keeps the cross hairs 31 and 32 in alignment, in the line V. When these cross hairs are centered on the target which he sees in the mirror 3, by reflected vision along the line R, the pilot knows that the target is in line of fire of his gun. The spaced cross hairs 31 and 32 in effect fix the line of vision V of the pilot so that it does not vary by reason of a different positioning of his head. Incidentally, since the height of pilots will vary, suitable adjustment may be provided to accommodate this, and to that end the plate 3', carrying the cross hairs 31, has been shown as adjustably mounted at 33 for movement transversely of the line of vision. In like fashion the mirror 3 may be tilted about a transverse axis 34 by means such as the set screw 35, and thus it may be adjusted to bring it into proper coordination with the position of the gun barrel. The target is then seen along the new line of reflected vision R' (see Fig. 3).

It is necessary that the sighting means be movable in synchronism with the gun as the latter is adjusted for aiming, and in such manner that the coordination between the mirror 3 and the gun is always maintained in all adjusted positions. Accordingly, means are provided to accomplish such coincident and corresponding movement and to such ends a worm segment 36 may be secured upon the rock shaft 34, with a worm pinion 37 in mesh therewith, and this worm pinion 37 is suitably connected to the motor 2 or to the adjusting means for the guns themselves, or to means which are adjustable in accordance with adjustment of the guns. The precise connection is largely immaterial, the desideratum being connections which coordinate the adjustments of the gun and of the sighting means. As herein shown, in purely suggestive or diagrammatic fashion, the pinion 37 is carried upon a shaft 38, which by positive transmission means 39, correct as to extent and direction of movement, is connected to the motor 2, so that as the motor 2 rotates the nut 13 to adjust the guns, the motor is at the same time adjusting correspondingly the position of the sighting mechanism typified by the mirror 3. The precise details of this will vary with each installation, and are readily determined once the characteristics of a given installation are known.

As may be seen in Fig. 1, the upper and lower limits F and F' of the field of fire of the guns encompass the fixed horizontal stabilizer 93 and the swingable elevator 91. The guns are normally fired through electrical means, and it is convenient to provide in the main firing circuit 43, contacts 41 and 42, disposed in contact with and at opposite sides of a conductive plate 4, carried upon the rock shaft 11, but including an insulating segment 42. The insulating segment 42 is so positioned, and is so coordinated with the movement of the gun and the location of the control surface, that it interrupts the current in the firing circuit to the guns during such time as the gun is swinging past the fixed control surface 93.

If the elevator 91 may swing into the guns' line of fire, it may be notched out to avoid being hit, as at 91'. If this is not done, then it is of course essential to prevent firing of the guns whenever the elevator 91 is swung upward or downward into the guns' field of fire, yet it is desirable to permit firing of the guns at all times except when the control surface swings so far up or down as to be in danger of entering the guns' instantaneous line of fire. Accordingly, in such an arrangement, there are means provided, interconnecting between the firing controls of the guns and the controls for the elevator 91, so that firing of the guns is further interdicted by interfering movement of the elevator.

The normal controls of the elevator include a mast 95 and cables 97U and 97D extending forwardly to the pilot's cockpit, or their equivalents, connected to the usual control stick there present. Within the main gun-firing circuit 43 is included a normally closed and self-closing switch element 44 which is positioned adjacent one of the cables 97U or 97D, and upon such cable, for instance the cable 97U, properly spaced at either side of the switch element 44, are provided stops or balls 99U and 99D. Upon sufficient movement of the cable 97U forward or rearward as to cause the elevator 91 to swing upward or downward into the line of fire of the guns, one of the balls 99U or 99D will engage the switch element 44 and will move it to break the firing circuit through the lead 43. Neither of the guns can fire so long as the switch 44 is open, but this switch is arranged to be closed automatically, as by spring means (not shown), immediately upon movement away of the deflecting ball 99U or 99D.

The guns IR and IL may be so located that they fire at opposite sides of the vertical fin 94, but may fire in a line so close to the fin that the rudder 92 may in some positions enter the line of fire of one or the other of the guns. In similar fashion, provision is made to disable the interfering gun at such times, for it is scarcely feasible to notch out the rudder throughout the distance subtended by the guns' angle of fire. The rudder 92 is normally swung by a mast 96, operated by cables 98R and 98L, or the equivalent, extending forwardly to the normal rudder bar (not shown) in the pilot's cockpit. Upon each of these cables 98R and 98L there is provided a stop or ball 49R or 49L, corresponding to the walls 99U and 99D, which engages a switch element 45R or 45L in the shunt firing circuit 43R or 43L of the corresponding gun 1R or 1L. In the same fashion as previously described, sufficient movement of the control cable 98R or 98L will break the firing circuit of the gun on the side towards which the rudder is swung, but will keep the other gun in action through its individual shunt circuit 43R or 43L. The opened shunt is kept open until the rudder has again swung back sufficiently toward neutral position that it is out of the line of fire of this particular gun, and then closes automatically. In this way both guns are kept in action to the maximum degree possible, and only one gun need be disabled momentarily by reason of rudder action.

These various safety arrangements operate only during such brief times as there is danger that firing of the guns would carry away some of the control surface of the airplane in which they are mounted, and these safety switches are immediately self-closing upon the removal of the swung control surface out of the line of fire. In consequence the guns can continue to fire to the greatest possible degree, and are only prevented from firing, but then automatically, when there is danger of shooting away one of these control surfaces. Adjustment of the guns does not affect the safety switches 44, 45R and 45L, for the opening of these switches is governed by the position of the corresponding control surface, and not by the position of the guns, yet the guns, whatever may be their position of adjustment, are positively prevented from firing only during such part of their adjustment as directs them toward the fixed horizontal stabilizer 93, or during a time when a movable control surface is swung into the firing zone, beyond positions shielded by the fixed surface ahead of it.

The guns are controlled, as is customary, by a firing key 40 in the main lead 43 and the customary safety switch 46 is likewise provided in this main circuit. The motor 2 is a reversing motor, and is controlled by a switch 20. Both the switch 20 and the firing key 40 and safety switch 46 are arranged conveniently to the forwardly facing pilot. The firing key 40, indeed, may be upon his control stick, as is customary.

The principles of this invention, particularly as to distant control of a gun upon an airplane, as to the coordination of the sighting means with the adjustable gun, and as to prevention of firing of the gun when an aircraft element moves into its line of fire, may be applied equally well to forwardly firing guns, or to airplanes which are other than single-seated planes, where conditions are such as require such distant control means, coordinating means, or fire-interdicting means.

Other modifications and advantages of the present invention both with respect to general arrangement and detailed features which may become apparent to those skilled in the art after a reading of the foregoing specification are each intended to be embraced within the scope and spirit of this invention as more particularly defined in the appended claims.

I claim:

1. In combination, a gun mounted upon an airplane, means for effecting aiming movement of said gun, indirect sighting means including a rear-view mirror provided with cross hairs, and reference cross hairs spaced from said mirror, and with said mirror cross hairs defining a straight line passing through the sighting position of the gunner's eye, power means operatively connected to said gun aiming means for moving said mirror in synchronism with aiming movement of the gun to maintain the line of sight reflected from said mirror parallel with the direction in which said gun is aimed in every position thereof, and force transmitting connections between said power means and said mirror and between said power means and said gun adapted to cause corresponding simultaneous movement of said mirror and said gun.

2. In a sighting system for a gun mounted upon an airplane and having means for effecting aiming movement of said gun, indirect sighting means including a rear-view mirror having a transparent central portion provided with cross hairs, and reference cross hairs spaced from said mirror at the side thereof remote from the sighting position of the gunner's eye, and with said mirror cross hairs defining a straight line passing through such sighting position, and means operatively connected to said gun aiming means for moving said mirror in synchronism with aiming movement of the gun to maintain the line of sight reflected from said mirror parallel with the direction in which said gun is aimed in every position thereof.

3. In an aiming system for a gun, a reflector sight consisting of a pair of datum points aligned to lie on a direct line extending through a gunner's eye, a reflector element mounted for angular tilting about an axis passing through one of said datum points, an aiming control mechanism, a source of mechanical power connected to be operated in accordance with manipulation of said control mechanism, and a power transmitting connection operatively linking said source with the reflector element to cause movement of the sight in angular deviation from the line of sight through the reference points.

4. In a sighting device for a gun mounted upon an airplane, means for effecting aiming movements of said gun, indirect sighting means including a reference element remotely disposed in the field of view of a gunner, a reflector having a transparent portion intermediately disposed on the line of sight extending from the sighting position of the gunner's eye to the said remote reference element, second visible reference means associated with the transparent portion of said reflector in optical alignment with said remote reference element to define the said line of sight, said remote reference element being visible through said transparent portion of said reflector from the sighting position of the gunner's eye, a mounting supporting the reflector for sighting adjustment perpendicular to the line bisecting the angle between an incident ray reaching the reflector from a target object and the reflected ray reaching the gunner along said line of sight and means operatively connecting said gun aiming means with said reflector mounting arranged for automatically synchronized movements of said gun and sighting reflector.

5. In a sighting device for a gun mounted upon an airplane, means for effecting aiming movement of said gun, indirect sighting means including a reference element remotely disposed in the field of view of the gunner, a reflector having a transparent portion intermediately disposed on the line of sight extending from the sighting position of the gunner's eye to the remote reference element, second visible reference means associated with the transparent portion of said reflector to define with said remote reference element said line of sight, said remote reference element being visible through said transparent portion of said reflector, an adjustable mounting supporting the reflector and permitting sighting adjustments about an axis defined by said second reference means to maintain the reflector surface perpendicular to the line bisecting the angle between an incident ray reaching the reflector from a target object and the reflected ray reaching the gunner along said line of sight, a source of power, a remote control for said source, and power transmission means, operably connecting the reflector and said source of power for the automatically synchronized movement of said gun and indirect sighting means.

6. In a gunner's sighting system for a gun movably mounted upon an aircraft and having means for effecting aiming movements of said gun, indirect sighting means including a mirror having a transparent portion provided with reference indicia within said transparent portion, a second reference indicia spaced from said mirror on the side thereof remote from the sighting position of the gunner's eye, and with said mirror indicia defining a straight line passing through said sighting position, and means operatively connected to said gun aiming means arranged to move said mirror about said first reference indicia as an axis is in synchronism with aiming movements of the gun to maintain the line of sight reflected from said mirror parallel with each of a plurality of directions into which said gun may be aimed.

JOHN F. HABERLIN.